May 18, 1971     J.C. BOUDREAU     3,579,554
DESLUDGING TEL WITH OXYGENATED WATER
Filed Oct. 31, 1968
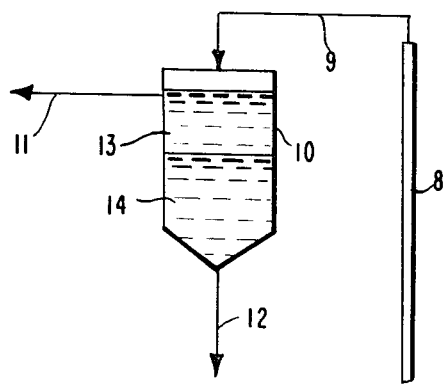
FIG. 1
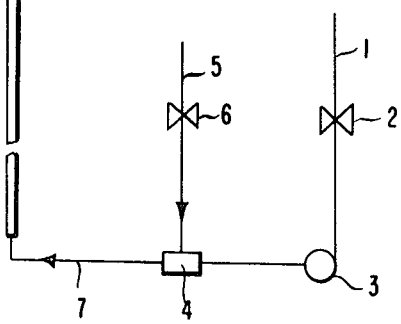
FIG. 2
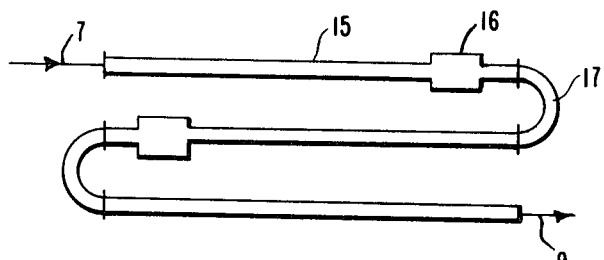
FIG. 3
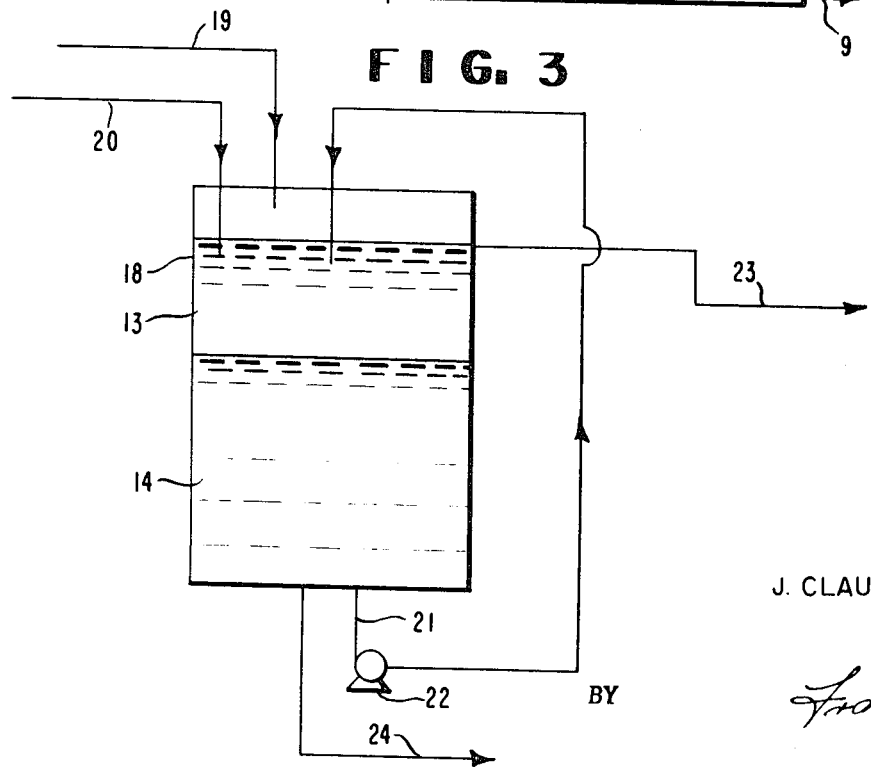
INVENTOR
J. CLAUDE BOUDREAU
BY Francis J. Bromley
ATTORNEY United States Patent Office 3,579,554
Patented May 18, 1971

3,579,554
DESLUDGING TEL WITH OXYGENATED WATER
Jean Claude Boudreau, Landenburg, Pa., assignor to E. I. du Pont de Nemours and Company
Filed Oct. 31, 1968, Ser. No. 772,339
Int. Cl. C07f 7/26
U.S. Cl. 260—437
9 Claims

ABSTRACT OF THE DISCLOSURE

A process for purifying impure tetraethyllead by mixing said impure tetraethyllead with water containing dissolved oxygen thereby converting the impurities into a sludge phase.

BACKGROUND OF THE INVENTION

(1) Field of the invention

This invention relates to a step in the manufacture of tetraethyllead and more particularly to an improved process for removing sludge forming impurities from tetraethyllead.

(2) Description of the prior art

The lead alloy which is reacted with ethyl chloride in the commercial preparation of tetraethyllead usually contains metallic impurities such as bismuth. The tetraethyllead formed on reaction with the ethyl chloride contains organo metallic compounds which on exposure to air decompose and form objectionable sludge which is frequently highly inflammable and very reactive on exposure to the air. The problem of eliminating these sludge-forming compounds has long been recognized and various means have been employed to overcome this problem.

One of the existing processes is that disclosed by Bertolette and Parmelee, in U.S. Pat. 2,400,383, and it comprises blowing an oxygen containing gas through the tetraethyllead while employing agitation to insure dispersion of the oxygen throughout. Contact with the oxygen converts the sludge forming compounds present into sludge. Bertolette and Parmelee stress that a large excess of oxygen is desirable to insure good distribution of the oxygen throughout the tetraethyllead. To avoid a build-up of the sludge on the sides of the containing vessel, a continuous layer of water is maintained over the surface of the tetraethyllead during the aeration. This continuous water layer is intended to wash the air or other oxygen-containing gas free of tetraethyllead thus reducing the tendency for it to escape to the atmosphere. It is, however, recognized in the art that despite the existence of a continuous water layer, tetraethyllead loss to the atmosphere by the waste air stream leaving the reactor can occur. Although the quantity of entrained tetraethyllead is low enough to make any attempts at removal or recovery of tetraethyllead from the air waste stream a costly and difficult procedure, it is substantial from the standpoints of yearly production loss and air pollution. Desludging in this manner is relatively slow requiring several hours to fill the aeration vessel and sparge its contents with air.

In other desludging processes described by Parmelee in U.S. Pats., 2,410,356; 2,426,789; 2,440,810, the crude tetraethyllead is washed with aqueous solutions of designated oxidizing agents including hydrogen peroxide, the dichromates, peroxides, perborates and chlorites of the alkali metals and the alkaline earth metals. These agents react with the sludge-forming impurities to convert them into insoluble materials or water-soluble materials or both. The mixture is then allowed to settle and the tetraethyllead is separated out. The washing may take place in the presence of air but when air or other oxygen-containing gases are excluded the chlorite and dichromate oxidizing agents additionally require the presence of a mineral acid to effect desludging. The Parmelee processes therefore necessitate utilization of the designated oxidizing agents which will introduce a cost factor into the production of purified tetraethyllead which is avoided by the present invention which utilizes oxygenated water without any added oxidizing agent. Also the need for introduction of a mineral acid in the process of Parmelee results in additional steps whereby such acid must be removed from the ultimate tetraethyllead product. It is recognized in the art that said acid must be removed with a consequent loss of time and increase to cost. Once removed, the waste acid must be disposed of or purified for reuse thereby necessitating still another step.

It can be seen therefore that there are several requirements which a tetraethyllead desludging process should meet. It must of course provide an adequate means for removing sludge-forming compounds from impure tetraethyllead. The method utilized should also be rapid, employing a minimum of steps; as inexpensive as possible, and should not cause undesirable side occurrences such as release of tetraethyllead into the atmosphere through an air waste stream. In contrast to the prior art, the foregoing requirements are met by the process of the present invention.

SUMMARY OF THE INVENTION

The present invention comprises a process whereby water containing at least 4 p.p.m. of dissolved oxygen is mixed with impure tetraethyllead in the absence of any added oxidizing agent, including the use of oxygen as a separate air stream, the oxygen dissolved in the water reacting at a rapid rate with the sludge forming impurities to form a sludge phase. Purified tetraethyllead can thus be separated from the water and sludge.

DESCRIPTION OF THE DRAWING

Various reactors in which the present invention can be employed are illustrated in the attached drawings in which:

FIG. 1 shows a continuous reactor comprising a turbulent flow pipeline reaction zone coupled with a feed section and a product recovery section;

FIG. 2 shows a pipeline reaction zone for continuous non-turbulent flow comprising tubular reactor sections, with one or more expansion joints or chambers, joined by return bends; and FIG. 3 shows a reactor useful in batch, semi-continuous or continuous operation comprising a reaction tank with independent water and tetraethyllead feed lines and a product recovery line.

DESCRIPTION OF THE INVENTION

It is convenient for purpose of discussion to characterize tetraethyllead by its sludge index which reflects its tendency to form sludge deposits in storage. The index is the number of grams of solid formed by sparging 100 ml. of tetraethyllead with air for one-half hour at 25–30° C., filtering, washing the collected solid with 95% ethanol, drying at 110° C. and weighing. Sludge indices greater than 0.002 are considered objectionable. Commercially prepared tetraethyllead which is recovered by steam distillation may exhibit sludge indices as high as about 0.03 and require desludging before being blended as an antiknock agent. The present method is effective to reduce the sludge indices of such tetraethyl leads to values below 0.002, and, when desired, to reduce sludge indices which are already as low as about 0.0005 to 0.0002 or less.

The quantity of oxygen dissolved in the water will normally range from about 4 p.p.m. to the saturation value which is about 70 p.p.m. for gaseous molecular oxygen in water at about 0° C. Preferably the oxygen will be present as dissolved air, for reasons of economy, and water pumped directly from rivers has been utilized effectively. Although satisfactory results are obtained with aerated water containing between about 4 p.p.m and about 8 p.p.m. of oxygen as air, even faster removal of the sludging impurities may be effected with water that has been freshly aerated with air or oxygen gas to increase its oxygen content up to the saturation value at the operating temperature. Such higher oxygen content solution may be advantageously used at the higher operating temperatures where the solubility of air itself is lowest. An oxygen content range of from 7 p.p.m. to 11 p.p.m. and at a temperature of from 30° C. to 10° C. is preferred.

The operating temperature may vary over the liquid water range from just over 0° C. up, but normally is not above 80° C. since oxygen solubility as air or gaseous oxygen decreases with increasing temperature. The pressure is normally atmospheric, but higher pressures may be used since air and molecular oxygen solubilities increase with increasing pressure.

The quantity of the aqueous solution employed may vary widely depending on the oxygen content of the aqueous solution, the impurity content of the tetraethyllead, the particular method employed for effecting intimate contact between the two liquids, the allotted contact time, and the effect desired. Normally there is used at least about 1 volume and not more than about 10 volumes of the aqueous solution per volume of tetraethyllead to be purified. Lower ratios are not always satisfactory and higher ratios are unnecessary and often uneconomic to handle. Preferred water/tetraethyllead ratios are in the 1/1 to 5/1 range, particularly 2/1 to 4/1 for continuous operation in pipeline reactors.

The present invention is then a process in which oxygen-containing water as described above is mixed with the impure tetraethyllead in the absence of any added oxidizing agent. There may be used to advantage various means known to the art for mixing liquids of considerably different densities, such as turbulent flow, circulating the mixture externally between the bottom and top of a mixing tank, and passing the materials through the center of a contrifugal pump. The mixing, which results in the conversion of the sludge forming impurities into sludge, should be continued until the tetraethyllead has been purified to the desired degree, which is determined by sampling the tetraethyllead and establishing its sludge index. No additional purification is necessary. The mixture should be allowed to stratify into an upper water layer, a lower tetraethyl lead layer and normally at the interface between them the deposited sludge. The layers can be separated and the purified tetraethyllead recovered by conventional means, such as drawing off the lower tetraethyllead layer after the mixture has been allowed to stand and stratify and processing the sludge and water layers according to known methods.

The process of this invention may be better understood by reference to the drawings.

FIG. 1 shows a continuous reactor comprising a pipeline reaction zone coupled with a feed section and a product recovery section. In operation, water containing dissolved oxygen as described above, is fed through line 1 and eductor 4, which draws the tetraethyl lead stream through 5 into common feed line 7. The relative flow rate and volume ratio are controlled by valves 2 and 6. The two-phase mixture passes through tubular reactor 8 wherein the mixture is intimately mixed, for example by turbulent flow, and transferred via line 9 to settling tank 10, where, after the mixture stratifies the desludged tetraethyllead product 14 is separated from the spent aqueous phase 13 and recovered through line 12. Settling tank 10 can be operated so as to continuously separate the mixture and remove the water layer through overflow 11 and the tetraethyllead through 12. Neither the length nor the diameter of the tubular pipeline is critical provided the two-phase liquid mixture can be passed through it at rates sufficient to cause turbulent flow mixing. Turbulent bow generally requires flow rates that correspond to Reynolds numbers of at least 6000 and preferably correspond to such numbers between 50,000 and 200,000.

The tublar reaction zone may be disposed horizontally or nearly so; or it may be disposed vertically and the mixture passed either down through it or as shown in FIG. 1 up through it. Alternatively, to save space, the reaction zone may consist of a series of tublar sections coupled with return bends to form an S-shaped reaction zone or an interconnected series of such S-shaped zones.

FIG. 2 illustrates a pipeline reaction zone for continuous non-turbulent flow operation. This comprises tubular reactor sections 15 in series joined by return bends 17 wherein one or more of such sections include one or more expansion joints or chambers 16 of relatively short length. Expansion joints 16 in having a greater diameter than main tubular reactor sections 15 provide for non-turbulent flow mixing. Likewise, return bends 17 is abruptly reversing flow direction promote good mixing of the two-phase mixture.

FIG. 3 illustrates another reactor, useful in batch, semi-continuous or continuous operation, which includes reaction tank 18 fitted with water inlet 19, tetraethylled feed line 20, and water overflow line 23 at the upper end of the tank, and return line 21 (leading back to the top of the tank) and tetraethylled takeoff line 24 at the bottom of the tank.

In one embodiment both aerated water and tetraethyllead to be desludged are added to tank 18 in about equal volumes through lines 18 and 20, and the contents are circulated from the bottom to the top via return line 21, aided by pump 22. Circulation is maintained until the tetraethyllead sludging index has been reduced to the desired extent. The mixture is allowed to stratify and the lower clear tetraethyllead layer removed via 24. Alternatively, the tank is first filled with aerated water, and tetraethyllead is fed gradually, continuously or intermittently, whereupon water begins to be displaced through line 23. The incoming tetraethyllead being heavier than and immiscible with the water falls to the bottom of the tank, passing through the oxygen-containing water and accumulating as a pool, and is returned to the top of the outer layer for re-passage through it via line 21. When most or substantially all of the water, i.e. between 50 and 95 volume percent, has been displaced the lead feed and circulation of tetraethyllead through lines 20 and 21 is stopped, the reaction mixture is allowed to stratify, and the purified tetraethyllead product removed through 24. In this embodiment it will be apparent that from the start to the finish of the tetraethyllead feed the oxygen-water/tetraethyllead volume ratio varies from an initial almost infinite ratio to a final ratio between about 2/1 and about 1/1.

Pump 22 in FIG. 3 may be replaced by a water eductor which utilizes the flow of additional oxygen-water to recirculate the tetraethyllead-aqueous mixture via return line 21.

Other mixing means known to the art may be utilized with equal effectiveness.

EXAMPLES

The following examples describe the invention in further detail. Thes examples are intended to be merely illustrative of the invention and not in limitation thereof. Unless otherwise indicated all parts are by weight.

EXAMPLE 1

The reactor was an S-shaped stainless steel pipeline essentially as illustrated in FIG. 2. The main reactor sections and the two return bends had a ⅛ inch inside diameter and a 6 foot total length. The two bends were each about 2 feet from the inlet and outlet ends. The two expansion joints were ¼ inch inside diameter by 1 inch long and were situated 20 incres and 40 inches, respectively, from the inlet end of the reactor.

In Examples 1–20, the tetraethyllead employed was obtained from a commercial manufacturing unit wherein ethyl chloride and mono-sodium lead alloy are reacted in an autoclave and the reaction mass is steam distilled.

Simultaneously the steam-distilled tetraethyllead having a sludge index of 0.0201 and water containing 7 p.p.m. of oxygen by weight as air were passed at 25° C. into the popeline reactor at a water/tetraethyllead volume ratio of 2.6 and at a rate (74 cc./min.) providing a residence time of 15 seconds. The effluent from the reactor was allowed to stratify and the clear lower tetraethyllead layer was removed. Its sludge index was determined to be 0.0006.

EXAMPLES 2–19

Example 1 was repeated with 18 different tetraethyllead preparations having sludge indices between 0.0005 and 0.0243 as tabulated below, at water/tetraethyl ratios of 1.9 to 3.5 and at contact times of 15 or 30 seconds. The results were as follows:

| Example: | $H_2O$/TEL volume ratio | Contact time, seconds | Sludge index Before | Sludge index After |
|---|---|---|---|---|
| 2 | 2 | 15 | 0.0012 | 0.0002 |
| 3 | 3 | 15 | 0.0005 | 0.0002 |
| 4 | 2.5 | 15 | 0.0104 | 0.0009 |
| 5 | 2.4 | 30 | 0.0016 | 0.0013 |
| 6 | 2.8 | 30 | 0.0060 | Nil |
| 7 | 2.0 | 30 | 0.0168 | 0.0011 |
| 8 | 1.9 | 30 | 0.0060 | 0.0019 |
| 9 | 2.9 | 30 | 0.0035 | 0.0005 |
| 10 | 2.7 | 30 | 0.0127 | 0.0004 |
| 11 | 2.2 | 30 | 0.0243 | 0.0005 |
| 12 | 2.8 | 30 | 0.0094 | Nil |
| 13 | 1.9 | 30 | 0.0124 | 0.0001 |
| 14 | 2.1 | 30 | 0.0192 | 0.0005 |
| 15 | 2.5 | 30 | 0.0211 | 0.0007 |
| 16 | 3.2 | 30 | 0.0164 | 0.0005 |
| 17 | 1.5 | 30 | 0.0223 | 0.0005 |
| 18 | 3 | 30 | 0.0162 | 0.0009 |
| 19 | 3.5 | 30 | 0.0079 | 0.0005 |

The data show that the method of this invention utilizing aerated water containing a relatively small concentration of dissolved oxygen as air is highly effective to reduce the sludging indices to acceptable levels.

EXAMPLE 20

The reactor was essentially that illustrated in FIG. 3, except that a water eductor instead of a pump was utilized to recirculate the tank contents. The tank was filled to the overflow line with 5000 gallons of 50° C. water containing 4 p.p.m. dissolved oxygen as air. Impure tetraethyllead having a 0.0200 sludge index was fed into the tank just below the surface of the body of water at a rate of about 38 gal./minute. As tetraethyllead collected as a pool at the bottom of the tank it was withdrawn from the bottom and fed back to the top of the tank by means of the water eductor which introduced 60 gallons per minute of fresh water, containing 4 p.p.m. dissolved oxygen as air, into the vessel recirculation line. The recirculated tetraethyllead-water mixture re-entered the water layer at a point just below the surface. After approximately 2 hours, when about 4500 gallons of tetraethyllead had been fed and an equal volume of water had been displaced from the tank, the tetraethyllead feed and recirculation was stopped and the mixture was allowed to stratify. The sludge index of this treated tetraethyllead was 0.0002.

Example 20 was repeated with 22 different batches of tetraethyllead having sludge indices between about 0.002 and 0.03 with substantially similar results. The sludge indices of the treated tetraethyllead were all acceptably low.

As many different embodiments of this invention may be made without departing from the spirit and scope thereof, it is understood that the invention is not limited to the specific embodiments thereof.

The embodiments of the invention in which an exclusive property or privilege is claimed are defined as follows:

1. A process for removing sludge-forming impurities from impure tetraethyllead which comprises mixing said impure tetraethyllead with water containing at least 4 p.p.m. of dissolved oxygen in the absence of any added oxidizing agent, whereby sludge forming impurities are converted to sludge, thus reducing the sludge index of said tetraethyllead without further purification and then recovering purified tetraethyllead from the water and sludge.

2. A process according to claim 1 wherein the sludge index of the tetraethyllead is reduced to a value below 0.002.

3. A process according to claim 1 wherein the water contains 7 p.p.m. to 11 p.p.m. of dissolved oxygen and is at a temperature of from 30° C. to 10° C.

4. A process according to claim 1 wherein the mixture is allowed to stand to produce a bottom tetraethyl lead layer which is withdrawn.

5. A process according to claim 1 wherein the impure tetraethyl lead phase and the oxygen-containing water phase are continuously fed into and mixed in a pipeline reactor.

6. A process according to claim 5 wherein the impure tetraethyl lead phase and the oxygen containing water phase are mixed by turbulent flow.

7. A process according to claim 1 wherein the impure tetraethyl lead phase and the oxygen-containing water phase are mixed in a reaction tank by recirculating the water and tetraethyl lead through an outlet at the bottom of the tank and feeding said liquid back into the tank by means of an interconnected inlet at the top of the tank.

8. A process according to claim 5 wherein the impure tetraethyl lead phase and the oxygen-containing water phase are mixed in a reaction tank having additionally an inlet at the top for feeding impure tetraethyl lead from an external supply, another inlet at the top for feeding said oxygen-containing water from an external supply, an overflow line for removing liquid from the upper end of the tank and an outlet at the bottom of the tank for removing purified tetraethyl lead, the mixing of the two phaess being effected by (A) filling the reaction tank with the oxygen-containing water phase through the inlet at the top, (B) feeding the impure tetraethyl lead through the inlet at the top into the water phase in the tank, the tetraethyl lead, being heavier than and immiscible with the water, sinking to the bottom of the tank thereby displacing water through the overflow line, (C) removing the tetraethyl lead from the bottom of the tank and returning it to the top of the tank by the recirculation means where it reenters and again passes through the oxygen containing water phase, (D) maintaining (B) and (C) until substantially all of the water has been displaced through the overflow line and the tetraethyl lead sludge index has been reduced,
(E) allowing the mixture to settle and stratify
(F) drawing off purified tetraethyl lead through the takeoff line at the bottom of the tank.

9. A process according to claim 8 wherein the recirculation of step (C) is effected by a water eductor which also introduces an additional amount of said oxygen containing water.

References Cited

UNITED STATES PATENTS

| | | | |
|---|---|---|---|
| 3,277,134 | 10/1966 | Collier et al. | 260—437 |
| 3,308,061 | 3/1967 | Collier et al. | 260—437X |

TOBIAS E. LEVOW, Primary Examiner

H. M. S. SNEED, Assistant Examiner

U.S. Cl. X.R.

210—63